United States Patent
Lan et al.

(10) Patent No.: US 10,650,119 B2
(45) Date of Patent: May 12, 2020

(54) MULTIMEDIA DATA PROCESSING METHOD, APPARATUS, SYSTEM, AND STORAGE MEDIUM

(71) Applicant: Tencent Technology (Shenzhen) Company Limited, Shenzhen, Guangdong (CN)

(72) Inventors: Chong Lan, Guangdong (CN); Qiang Wu, Guangdong (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 89 days.

(21) Appl. No.: 16/124,916

(22) Filed: Sep. 7, 2018

(65) Prior Publication Data
US 2018/0365395 A1 Dec. 20, 2018

Related U.S. Application Data

(63) Continuation of application No. PCT/CN2017/074288, filed on Feb. 21, 2017.

(30) Foreign Application Priority Data

Mar. 10, 2016 (CN) .......................... 2016 1 0137507

(51) Int. Cl.
*G06F 21/10* (2013.01)
*H04L 29/06* (2006.01)
*G06F 21/62* (2013.01)

(52) U.S. Cl.
CPC .......... *G06F 21/10* (2013.01); *G06F 21/6218* (2013.01); *H04L 65/4084* (2013.01); *G06F 2221/0717* (2013.01)

(58) Field of Classification Search
CPC .......... G06F 21/10; G06F 21/30; G06F 21/31; G06F 21/6218; H04L 67/4084
See application file for complete search history.

(56) References Cited

U.S. PATENT DOCUMENTS 8,732,810 B2    5/2014 Gaddam et al.
2002/0099842 A1* 7/2002 Jennings ................. H04L 29/06
                                                    709/231
(Continued)

FOREIGN PATENT DOCUMENTS

CN    105657456 A    6/1916
CN    103888475 A    6/2014
(Continued)

OTHER PUBLICATIONS

International Search Report and Written Opinion dated May 11, 2017 for PCT Application No. PCT/CN2017/074288 (without English translation) (12 pp.).

(Continued)

*Primary Examiner* — Sher A Khan
(74) *Attorney, Agent, or Firm* — Brinks Gilson & Lione

(57) ABSTRACT

Embodiments of the present disclosure disclose a multimedia data processing method, apparatus, and a storage medium. In the embodiments of the present disclosure, a playing request carrying an identifier of multimedia data is received. A valid single-use verification parameter is generated according to the playing request. A link address of the corresponding multimedia data is obtained according to the identifier of the multimedia data. A playing address is generated according to the verification parameter and the link address. The multimedia data is played based on the playing address. This present disclosure improves the data security technology and prevent a user from capturing, by means of data packet capturing or by using third party software, a source file of the multimedia data used within a website.

15 Claims, 7 Drawing Sheets

(56) References Cited

U.S. PATENT DOCUMENTS

| | | | |
|---|---|---|---|
| 2004/0083364 A1* | 4/2004 | Andreaux | H04L 63/0457 713/165 |
| 2004/0156613 A1* | 8/2004 | Hempel | H04N 5/913 386/328 |
| 2009/0069090 A1* | 3/2009 | Moser | G07F 17/32 463/42 |
| 2010/0087241 A1* | 4/2010 | Nguyen | G07F 17/3218 463/17 |
| 2011/0131466 A1* | 6/2011 | Lamy-Bergot | H04L 1/004 714/758 |
| 2012/0108209 A1* | 5/2012 | Sun | H04H 60/15 455/411 |
| 2012/0284522 A1* | 11/2012 | Lewis | H04L 63/0435 713/181 |
| 2013/0047084 A1* | 2/2013 | Sanders | G06F 16/4387 715/716 |
| 2013/0166909 A1* | 6/2013 | Agrawal | H04L 63/123 713/168 |
| 2014/0095965 A1* | 4/2014 | Li | H04N 21/242 715/203 |

FOREIGN PATENT DOCUMENTS

| | | | |
|---|---|---|---|
| CN | 104618418 A | * | 5/2015 |
| CN | 104618418 A | | 5/2015 |

OTHER PUBLICATIONS

Office Action for China Patent Application No. 201610137507.0 dated Jan. 29, 2018 (without English translation) (6 pp.).

* cited by examiner

MULTIMEDIA DATA PROCESSING METHOD, APPARATUS, SYSTEM, AND STORAGE MEDIUM

RELATED APPLICATION

This application is a continuation application of PCT Patent Application No. PCT/CN2017/074288, filed on Feb. 21, 2017, which claims priority to Chinese Patent Application No. 201610137507.0, filed with the Chinese Patent Office on Mar. 10, 2016, both of which are incorporated herein by reference in their entireties.

FIELD OF THE TECHNOLOGY

The present disclosure relates to the field of communications technologies, and specifically to a multimedia data processing method, apparatus, and system, and a storage medium.

BACKGROUND OF THE DISCLOSURE

The development of Internet technologies and popularity of terminals result in an increasingly close relationship between the network and people. People can take part in various recreational and entertainment activities by using the network, for example, listening to music or watching a movie.

In the related technology, when multimedia data such as audio data or video data in a website is played, a media player implemented based on an audio tag in the Hypertext Markup Language 5 (HTML5) is generally used. For example, audio data such as a song A may be played. Specifically, a network address of a source file of the song A may be obtained at first by using an identifier of the song A. Then a source attribute of an audio tag in the page is assigned as the network address, and a playing process of the audio tag is called. The song A can be played by means of obtaining the audio data from the corresponding network address to executing the playing process.

In the foregoing process, problems with the related technology are that there is no effective solution to ensure data security of the source file.

SUMMARY

Embodiments of the present disclosure provide a multimedia data processing method, apparatus, and system, and a storage medium, which can improve multimedia data security.

According to a first aspect, the embodiments of the present disclosure provide a multimedia data processing method. The method includes receiving, by a device comprising a memory and a processor in communication with the memory, a playing request, where the playing request carries an identifier of multimedia data. The method includes generating, by the device, a verification parameter according to the playing request. The verification parameter is for single-use, and the verification parameter is valid within a validity period and is invalid outside the validity period. The method also includes obtaining, by the device, a link address of the multimedia data according to the identifier of the multimedia data and generating, by the device, a playing address according to the verification parameter and the link address. The method further includes receiving and playing, by the device, the multimedia data based on the playing address.

According to a second aspect, the embodiments of the present disclosure provide a multimedia data processing apparatus. The apparatus includes a memory storing instructions and a processor in communication with the memory. When the processor executes the instructions, the processor is configured to cause the apparatus to receive a playing request, the playing request carrying an identifier of multimedia data. When the processor executes the instructions, the processor is configured to cause the apparatus to generate a verification parameter according to the playing request. The verification parameter is for single-use, and the verification parameter is valid within a validity period and is invalid outside the validity period. When the processor executes the instructions, the processor is configured to cause the apparatus to obtain a link address of the multimedia data according to the identifier of the multimedia data and generate a playing address according to the verification parameter and the link address. When the processor executes the instructions, the processor is further configured to cause the apparatus to receive and play the multimedia data based on the playing address.

According to a third aspect, the embodiments of the present disclosure provide a multimedia data processing device including a memory and a processor, the memory storing executable instructions, and the executable instructions being used for performing the multimedia data processing method provided in the embodiments of the present invention.

According to a fourth aspect, the embodiments of the present disclosure provide a multimedia data processing system, including any multimedia data processing apparatus provided in the embodiments of the present disclosure.

According to a fifth aspect, the embodiments of the present disclosure provide a non-transitory computer readable storage medium. The non-transitory computer readable storage medium stores instructions, and the instructions, when executed by a processor, cause the processor to perform receiving a playing request. The playing request carries an identifier of multimedia data. The instructions, when executed by a processor, cause the processor to perform generating a verification parameter according to the playing request. The verification parameter is for single-use, and the verification parameter is valid within a validity period and is invalid outside the validity period. The instructions, when executed by a processor, cause the processor to perform obtaining a link address of the multimedia data according to the identifier of the multimedia data and generating a playing address according to the verification parameter and the link address. The instructions, when executed by a processor, further cause the processor to perform receiving and playing the multimedia data based on the playing address.

In the embodiments of the present disclosure, the playing request carrying the identifier of the multimedia data is received, the valid single-use verification parameter is generated according to the playing request, and the link address of the corresponding multimedia data is obtained according to the identifier of the multimedia data, then the playing address is generated according to the verification parameter and the link address, and the multimedia data is played based on the playing address.

In the present disclosure, the playing request is generated according to the verification parameter and the link address, and the verification parameter is single-use and only valid for a certain period of time. Therefore, even when the playing address is captured by a user by means of data packet capturing or by using a third party software, a source file of the multimedia data cannot be obtained, and thus, effectively avoiding a situation of a playing record leakage caused by multimedia data theft. Therefore, compared with the related technology, this present disclosure improves the data security technology.

BRIEF DESCRIPTION OF THE DRAWINGS

To explain technical solutions in embodiments of the present disclosure, the accompanying drawings needed in describing the embodiments are briefly introduced in the following. Apparently, the following accompanying drawings are only some embodiments of the present disclosure, and a person skilled in the art can derive other accompanying drawings from the accompanying drawings without creative work.

DESCRIPTION OF EMBODIMENTS

The following describes the technical solutions in embodiments of the present disclosure with reference to the accompanying drawings in the embodiments of the present disclosure. The described embodiments are mere examples. All other embodiments derived by a person skilled in the art based on the embodiments of the present disclosure without any creative work fall within the protection scope of the present disclosure.

In a process of researching and practicing the related technology, for the existing solution, a user can easily capture, by means of data packet capturing or by using third party software/program, a source file of multimedia data used in a website. Consequently, data security is poor.

To solve the problem of poor data security, the embodiments of the present disclosure provide a multimedia data processing method, apparatus, and system.

The multimedia data processing system may include any multimedia data processing apparatus provided in the embodiments of the present disclosure. In addition, the multimedia data processing system may further include other devices, for example, a client used for playing multimedia data, and a storage device used for storing multimedia data, such as a storage server or a content delivery network (CDN) server. The multimedia data processing apparatus may receive a playing request, generate a valid single-use verification parameter according to the playing request, and obtain a link address of the corresponding multimedia data according to an identifier for the multimedia data carried in the playing request, then generate a playing address according to the verification parameter and the link address, and play the multimedia data based on the playing address.

In an example, the multimedia data processing apparatus may be integrated in a server, for example and not limited to, a web page server, or an application server.

Figure 1A:
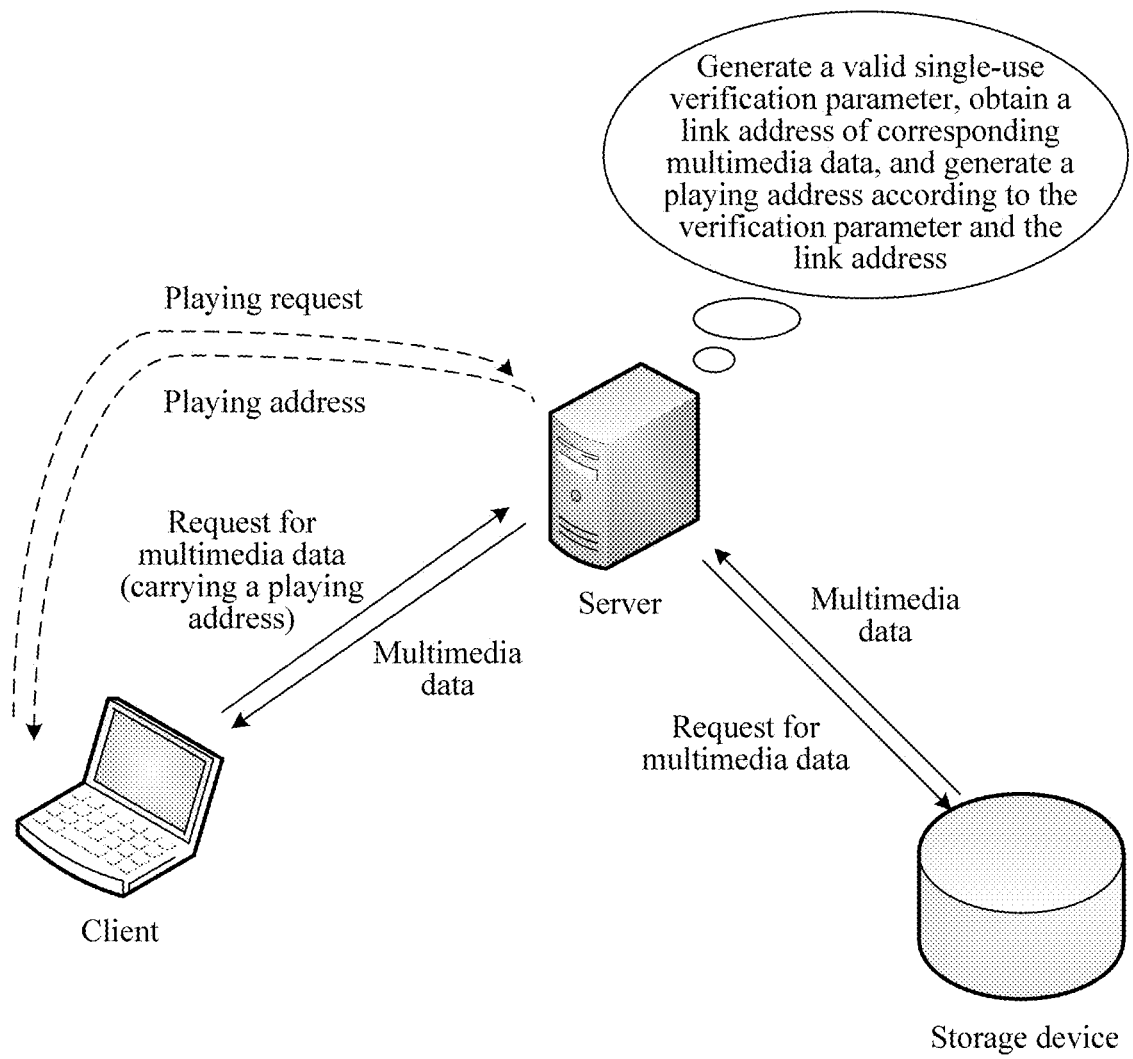
FIG. 1A is a schematic scenario diagram of a multimedia data processing method according to an embodiment of the present disclosure.

For example, as shown in FIG. 1A, a client may send, to a server, a playing request carrying an identifier of multimedia data needing to be played, the server generates a verification parameter according to the playing request, and obtains a link address of the corresponding multimedia data according to the identifier of the multimedia data, then generates a playing address according to the verification parameter and the link address, and returns the playing address to the client. The verification parameter is for single use and valid for a certain time duration. The client requests for the multimedia data from the server according to the playing address and plays the multimedia data. The multimedia data may be stored in the server, or stored in another storage device.

Detailed descriptions are made in the following with reference to different specific embodiments.

In this embodiment of the present disclosure, the descriptions are made from a perspective of a multimedia data processing apparatus, and the multimedia data processing apparatus may specifically be integrated in a network device such as a server.

A multimedia data processing method provided in this embodiment includes: receiving a playing request, the playing request carrying an identifier of multimedia data; generating a verification parameter according to the playing request, and obtaining a link address of the corresponding multimedia data according to the identifier of the multimedia data; generating a playing address according to the verification parameter and the link address; and playing the multimedia data based on the playing address. The verification parameter is for single use and valid for a certain time duration.

Figure 1B:
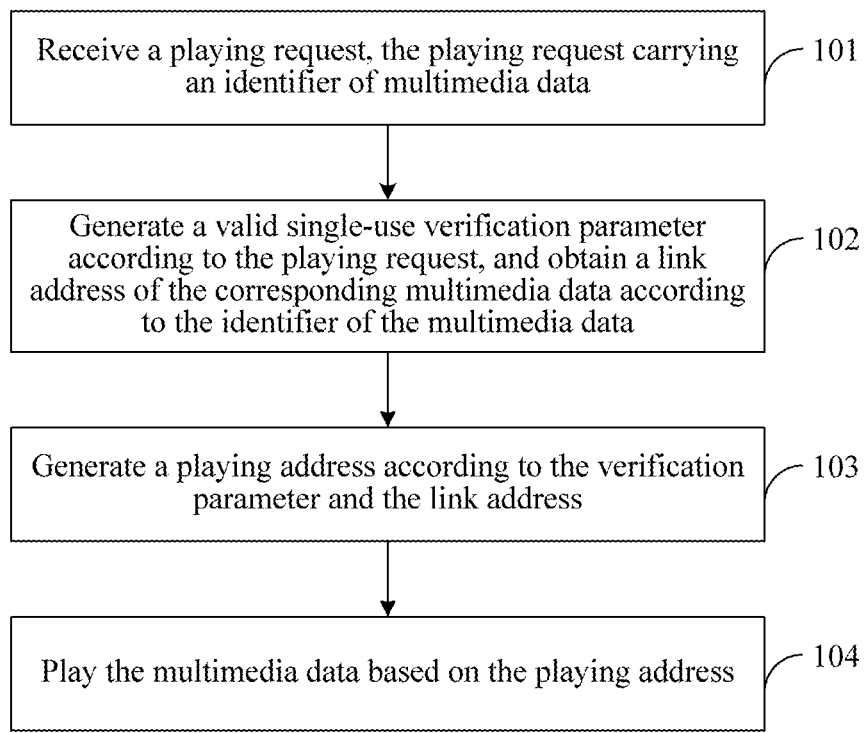
FIG. 1B is a flowchart of a multimedia data processing method according to an embodiment of the present disclosure.

As shown in FIG. 1B, a specific procedure of the multimedia data processing method may be as follows:

Step S101: Receive a playing request, the playing request carrying an identifier of multimedia data.

For example, specifically, the playing request triggered by a user may be received, and the playing request carries the identifier of the multimedia data needing to be played. For example, the playing request triggered by the user by using a client such as a browser may be received.

The identifier of the multimedia data may include at least one of a name or number information of the multimedia data, and the multimedia data may include at least one of audio data, video data, or other data.

Step S102: Generate a verification parameter (vkey) according to the playing request, and obtain a link address of the corresponding multimedia data according to the identifier of the multimedia data. The verification parameter is for single use and valid for a certain time duration.

Valid single-use refers to that the verification parameter is only allowed to be used once in a validity period of the verification parameter, and a second use is invalid. That is, the step of "generating a valid single-use verification parameter according to the playing request: may include:

generating the corresponding verification parameter according to the playing request and based on a preset algorithm; and setting a validity period of the verification parameter.

The validity period may be set according to an actual application requirement, and generally, may be set to be greater than a playing time length of the multimedia data. The validity period may be respectively set according to a playing time length of each piece of multimedia data, or a uniform value may be set for a plurality of pieces of multimedia data. For example, the validity period may be set based on the greatest value of the playing lengths in these pieces of multimedia data, and a value greater than the largest playing length is enough.

For example, when playing lengths of a plurality of pieces of multimedia data (for example, multimedia data 1, multimedia data 2, and multimedia data 3) are respectively 10 minutes, 15 minutes, and 20 minutes, according to the foregoing method for setting the validity period, validity periods of the plurality of pieces of multimedia data may be: 11 minutes, 16 minutes, and 21 minutes, respectively for each piece of the multimedia data; alternatively, the validity period may be set as the same for the plurality of pieces of multimedia data, for example and not limited to, 21 minutes; and alternatively, the validity period is set according to a preset value, for example and not limited to, 5 minutes.

It can be learned from the above that the step of "setting a validity period of the verification parameter" may include:

obtaining a playing length of the multimedia data, and setting the validity period of the verification parameter according to the playing length; or setting the validity period of the verification parameter to a preset value.

In one embodiment of the present disclosure, the preset value may be set according to an actual application requirement.

Step S103: Generate a playing address according to the verification parameter and the link address.

There may be a plurality of generation methods. For example, the corresponding verification parameter may be added after the link address. Another example may be that names of the multimedia data and the link address may be combined with the verification parameter according to a preset rule.

For example, an example in which the link address is http://www.xxx.com/xxx.mp3, and the verification parameter is "123456" is used, and the playing address may be generated: http://www.xxx.com/xxx.mp3?vkey=123456.

Optionally, to improve the data security, after the playing address is generated, the playing address may further be encrypted. That is, after the step of "generating a playing address according to the verification parameter and the link address", the multimedia data processing method may further includes:

encrypting the playing address.

In one embodiment of the present disclosure, an encryption method may be determined according to an actual application requirement. For example, a private protocol may be used for encryption, and a protocol format may be determined according to a current service mode and a technical architecture.

In another embodiment of the present disclosure, the encryption method may alternatively be according to a technology provided in the related technology, for example, encrypting by using various symmetric encryption algorithms and asymmetric encryption algorithms.

Step S104: Play the multimedia data based on the playing address.

(1). Obtain a data obtaining instruction carrying the playing address.

For example, the data obtaining instruction may be initiated by a player in a client such as a browser. The data obtaining instruction may be sent to the multimedia data processing apparatus (that is, a background apparatus), and the multimedia data processing apparatus receives the data obtaining instruction carrying the playing address.

(2). Extract the verification parameter and the link address from the playing address carried in the data obtaining instruction.

For example, after receiving the data obtaining instruction carrying the playing address, the multimedia data processing apparatus may obtain the playing address carried in the data obtaining instruction, extracts the verification parameter and the link address from the playing address, and then performs step S(3).

It needs to be noted that, when the playing address has been encrypted in step S103, after the client receives the playing address, the playing address needs to be correspondingly decrypted with a decryption method. The decryption method corresponds to the encryption method used in step S103.

For example, if the private protocol is used for encryption, decryption is performed according to a decryption method prescribed in the private protocol; if the symmetric algorithm is used for encryption, the decryption is performed by using a key encrypting the playing address; and if a public key of the asymmetric algorithm is used for encryption, the decryption is performed by using a private key of the asymmetric algorithm and the private key corresponds to the public key of the asymmetric algorithm.

(3). Obtain the corresponding multimedia data according to the extracted link address when it is determined that the verification parameter is valid.

For example, the following method may be used: obtaining the corresponding multimedia data from a multimedia database according to the extracted link address when it is determined that the verification parameter is valid. When it is determined that the verification parameter is invalid, the server may reject the data obtaining instruction.

The multimedia database may be stored in the multimedia data processing apparatus, or may be stored in another device, such as a CDN server.

Whether the verification parameter is valid is determined according to the validity period and a use record of the verification parameter. That is, the step of "determining whether the verification parameter is valid" may include:

determining whether the validity period of the verification parameter expires, and determining whether the verification parameter has been used; determining that the verification parameter is invalid if the validity period of the verification parameter expires or the verification parameter has been used; and determining that the verification parameter is valid if the validity period of the verification parameter does not expire and the verification parameter has not been used.

For example, specific methods may be as follows:

A. A first method to determine whether the verification parameter is valid.

Determine whether the validity period of the verification parameter expires; determine that the verification parameter is invalid if the validity period of the verification parameter expires; determine whether the verification parameter has been used if the validity period of the verification parameter does not expire; determine that the verification parameter is invalid if the verification parameter has been used; and determine that the verification parameter is valid if the verification parameter has not been used.

B. A second method to determine whether the verification parameter is valid.

Determine whether the verification parameter has been used; determine that the verification parameter is invalid if the verification parameter has been used; determine whether the validity period of the verification parameter expires if the verification parameter has not been used; determine that the verification parameter is invalid if the validity period of the verification parameter expires; and determine that the verification parameter is valid if the validity period of the verification parameter does not expire.

Whether the verification parameter has been used may be determined by means of searching a historical record. For example, when there is a record of the verification parameter in the historical record, it indicates that the verification parameter has been used; or when there is no record of the verification parameter, it indicates that the verification parameter has not been used. It needs to be noted that when the verification parameter has been used, the corresponding record of the verification parameter needs to be added into the historical record, to facilitate subsequent searching.

(4). Send the multimedia data to a client to play the multimedia data.

For example, the multimedia data may be sent to a player in a client such as a browser, and be played by the player according to the multimedia data.

Optionally, to further improve the data security, session verification of a login state may also be performed. For example, a session identifier may be added into the data obtaining instruction. After the data obtaining instruction is received and before the playing address is parsed, the server may determine whether the data obtaining instruction is valid according to the session identifier in the data obtaining instruction. When the data obtaining instruction is valid, the playing address is parsed. When the data obtaining instruction is invalid, the data obtaining instruction is rejected. That is, before the step of "extracting the verification parameter and the link address from the playing address carried in the data obtaining instruction", the multimedia data processing method may further include:

determining whether the data obtaining instruction is valid according to the session identifier; when the data obtaining instruction is valid, performing the step of extracting the verification parameter and the link address from the playing address carried in the data obtaining instruction; and when the data obtaining instruction is invalid, rejecting the data obtaining instruction.

In one embodiment of the present disclosure, when the data obtaining instruction satisfies a preset condition, it is determined that the data obtaining instruction is valid. The preset condition may be set according to an actual application requirement. For example and not limited to, a preset condition may be set according to whether a request party of the data obtaining instruction is one of the parties of the session corresponding to the session identifier of the data obtaining instruction; according to whether a format of the data obtaining instruction satisfies a preset format; and/or according to whether a parameter carried in the data obtaining instruction is a preset value.

Optionally, to avoid an illegal theft of the verification parameter, after the multimedia data is played, the verification parameter may further be destructed (that is, the playing address is destructed, and a request carrying the multimedia data of the playing address is not responded any more). In another embodiment of the present disclosure, the destruction of the verification parameter may depends on whether the validity period of the verification parameter has passed. The destruction of the verification parameter to prevent a user from visiting the playing address again by using another method.

For example, the illegal theft of the verification parameter may be avoided by using the following methods:

receiving a destruction instruction, and destructing the verification parameter according to the destruction instruction; or determining whether the validity period of the verification parameter expires, and destructing the verification parameter if the validity period of the verification parameter expires.

For example, after completing the playing of the multimedia data, the player of the client may send the destruction instruction to the multimedia data processing apparatus such as a web page server, and the multimedia data processing apparatus destructs the verification parameter according to the destruction instruction; alternatively, the multimedia data processing apparatus may directly determine whether the validity period of the verification parameter expires, destructs the verification parameter if the validity period of the verification parameter expires, or does not destruct the verification parameter if the validity period of the verification parameter does not expire.

It can be learned from the above that in this embodiment of the present disclosure, the playing request carrying the identifier of the multimedia data is received, the verification parameter is generated according to the playing request, and the link address of the corresponding multimedia data is obtained according to the identifier of the multimedia data, then the playing address is generated according to the verification parameter and the link address, and the multimedia data is played based on the playing address. Because the playing request is generated according to the verification parameter and the link address, and the verification parameter is only valid single-use, even the playing address is captured by a user by means of packet capture or by using third party software, a source file of the multimedia data cannot be obtained. Therefore, compared with the existing solution, this embodiment may greatly improve the data security.

According to the method described in the foregoing embodiments of the present disclosure, detailed descriptions are further made in the following by using an example.

In this embodiment of the present disclosure, an example in which the multimedia data processing apparatus is specifically integrated in the server, and the client including a browser is used for description.

Figure 2A:
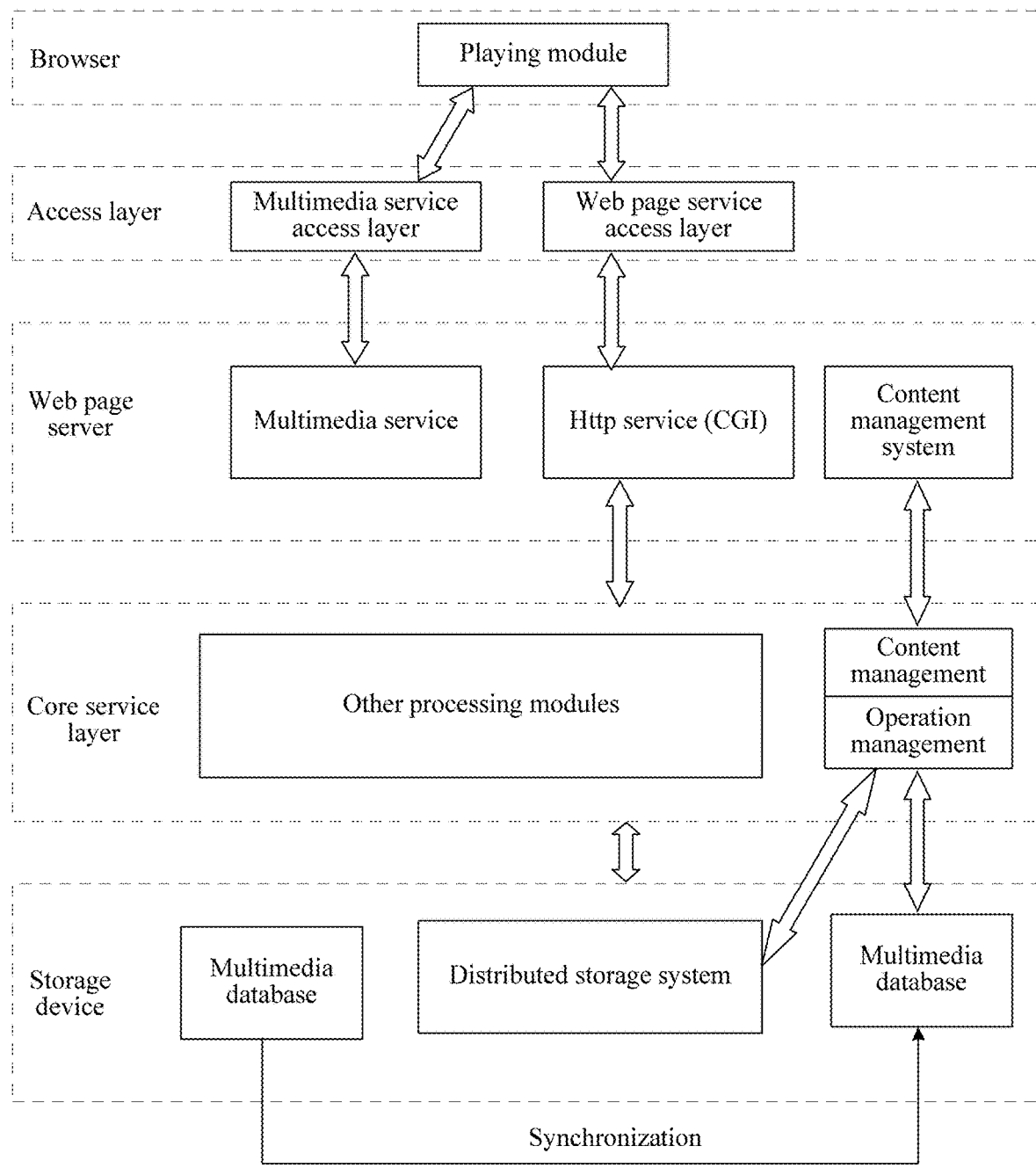
FIG. 2A is a schematic architecture diagram of a multimedia data processing system according to an embodiment of the present disclosure.

As shown in FIG. 2A, a multimedia data processing system may include a browser, a server, and a storage device, and specifically, may include the following structures:

(1). The Browser

The browser may be installed in a terminal or a client, and the browser may include a playing module which for example, may specifically be Web JOOK used for sending a playing request to the server, receiving a playing address returned by the server, then requesting for multimedia data from the server according to the playing address, and playing the multimedia data such as audio data or video data after receiving the multimedia data returned by the server.

The playing module may access to a web page server through an access layer. For example, refer to FIG. 2A, the playing module may communicate with a multimedia service module in the web page server by using a multimedia service access layer in the access layer, and communicate with a Hypertext Transfer Protocol (HTTP) service module in a web page server by using a web page service access layer (for example, the Nginx access layer). For example and not limited to, the HTTP service module may be a common gateway interface (CGI).

Figure 2B:
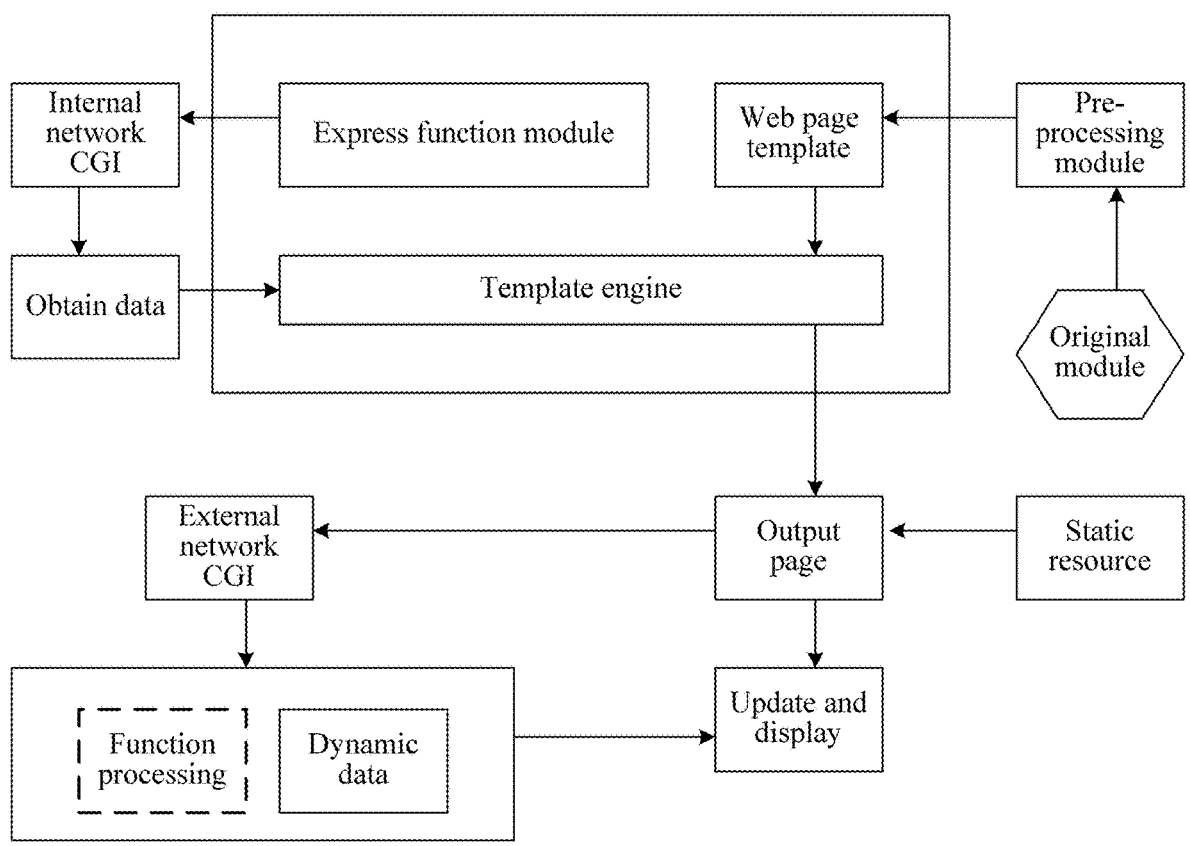
FIG. 2B is an architecture diagram of a web front end according to an embodiment of the present disclosure.

In a specific implementation, the foregoing functions may be performed on a function processing module of the existing browser, for example, referring to a dashed-line box part in FIG. 2B. FIG. 2B is an architecture diagram of a web front end. A template engine may generate and output a corresponding page by means of obtaining a page template and some data provided by an internal network. Content of the output page may include some static resources, and some interfaces used for communicating with an external network, so as to obtain some resources provided by the external network, that is, some dynamic data. In addition, real-time updating and displaying may be performed according to the dynamic data. The function processing module (that is, function processing in FIG. 2B) may control obtaining of the dynamic data, and process the obtained dynamic data. The dynamic data in this embodiment of the present disclosure is specifically represented as the multimedia data such as the audio data and video data. It needs to be noted that, FIG. 2B is merely an example, and is not a limitation to this embodiment of the present disclosure.

(2). The Server

The server is mainly used for communicating with the browser through the access layer, for example, The server may receive the playing request sent by the browser, generate a verification parameter according to the playing request, and obtain a link address of the corresponding multimedia data according to an identifier that is of the multimedia data and that is carried in the playing request, then generate a playing address according to the verification parameter and the link address, and return the playing address to the browser. The verification parameter is for single use and valid for a certain time duration. The browser requests for the multimedia data from the server according to the playing address. After receiving the request for the multimedia data, the server obtains the corresponding multimedia data from the storage device, and sends the corresponding multimedia data to the browser, so that the browser plays the multimedia data.

The server may be implemented as an independent entity, or be implemented by using several entities. For example, referring to FIG. 2A, the server may include a web page server and an application server. This may be specifically as follows:

The web page server may function as a gateway, and is configured to receive and process various requests sent by the browser, and send processing results of the requests to the application server for further data processing, for example, generating the verification parameter, obtaining the link address of the multimedia data, and generating the playing address. The web page server may further be configured to verify validity of the various requests sent by the browser, and send the requests to the application server only if the requests are valid. As shown in FIG. 2A, the web page server may include the multimedia service module, the HTTP service module (that is, a multimedia service and an HTTP service in FIG. 2A), and a content management system (CMS). The multimedia service module communicates with the browser by using the multimedia service access layer, the HTTP service module (for example, the CGI) communicates with the browser by using the web page service access layer, and the CMS may communicates with the storage device by using a content management port and an operation management port (referring to content management and operation management in FIG. 2A) in the application server, to obtain corresponding data, for example, the multimedia data.

The application server may be referred to as a core processing layer or a core service layer. The application server may include the content management port, the operation management port, and other processing modules, for example and not limited to, a searching module, a user task module, and a user collection module. The application server is mainly used for processing the data according to the requests or request results sent by the web page server.

For example, the application server may specifically generate the verification parameter according to the playing request sent by the web page server, and obtain the link address of the corresponding multimedia data according to the identifier that is of the multimedia data and that is carried in the playing request, then generate the playing address according to the verification parameter and the link address, and send the playing address to the web page server. The web page server sends the playing address to the browser through the access layer.

(3) The Storage Device

The storage device, also referred to as a storage, may be an independent storage entity, for example, a storage server, or may be a storage cluster, for example, a cloud memory, or a CDN server. The storage device is mainly configured to provide the server (for example, the application server) with the multimedia data, for example, the audio data or video data.

For example, referring to FIG. 2A, the storage device may include a distributed storage system (for example, the Cloud KeyValue (CKV)), and a plurality of multimedia databases. The plurality of multimedia databases may store related information about the multimedia data, and the plurality of multimedia databases may keep synchronized among them. The distributed storage system is mainly configured to exchange with the server, for example, the application server, to process various types of requests. The multimedia databases may provide the corresponding data for the content management port and the operation management port in the application server according to the processing results of the distributed storage system. For example, when the distributed storage system receives a multimedia data obtaining request sent by the application server, and determines that the multimedia data obtaining request is valid, the multimedia databases may provide the corresponding multimedia data for the content management module and the operation management module in the application server.

Based on the architecture of the multimedia data processing system, detailed descriptions are further made in the following by using an example.

Figure 2C:
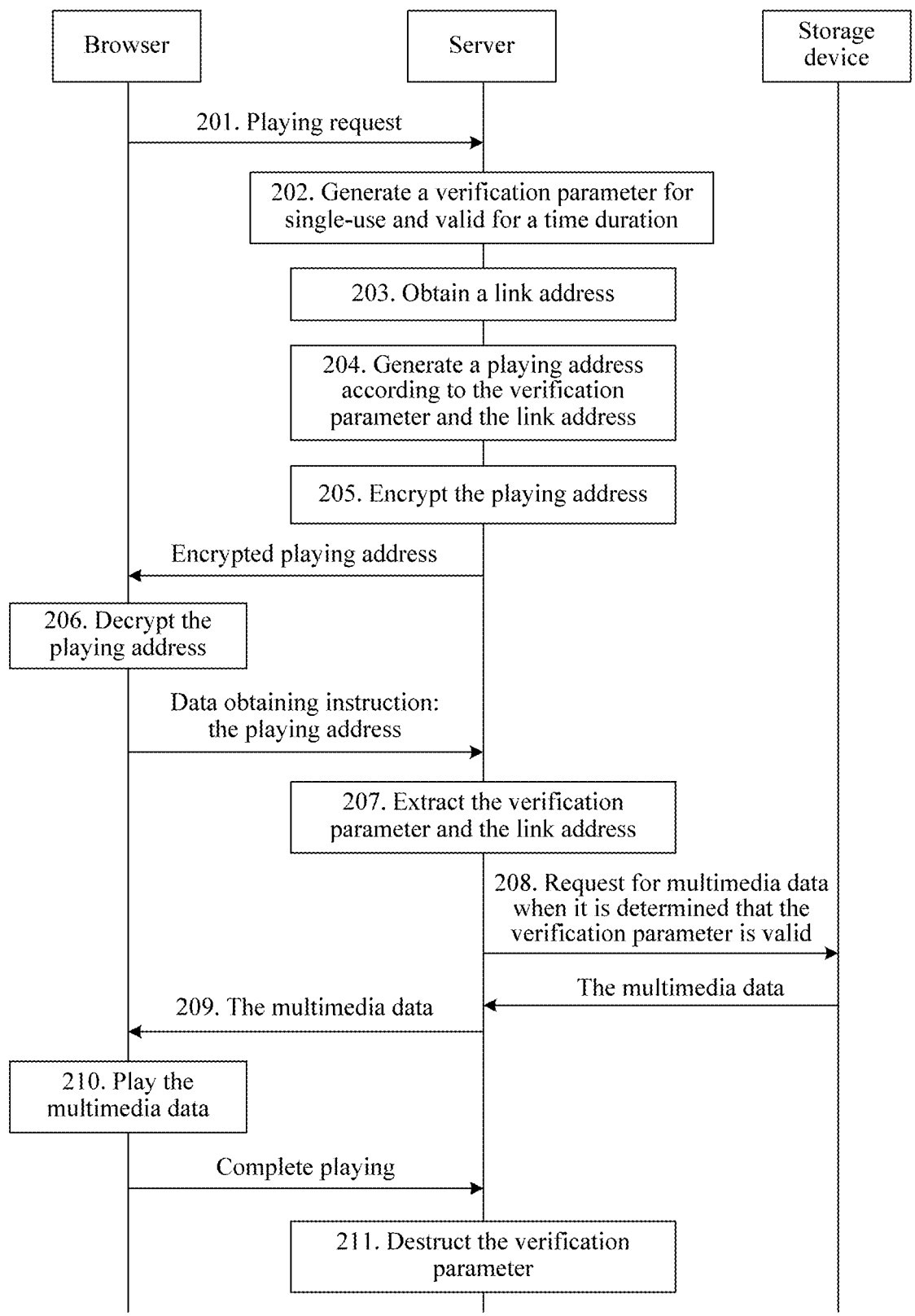
FIG. 2C is another schematic flowchart of a multimedia data processing method according to an embodiment of the present disclosure.

As shown in FIG. 2C, a specific procedure of a multimedia data processing method provided in this embodiment of the present disclosure may be as follows:

Step S201: A browser sends a playing request to a server, the playing request carrying an identifier of multimedia data.

For example, the browser may send the playing request to a web page server by using an access layer, and the web page server sends the playing request to an application server.

For example, when a user needs to play a song A, and clicks on a playing button of the song A on a web page, the browser generates a playing request carrying an identifier of the song A, and sends, by using the access layer, the playing request to the web page server corresponding to the web page. The web page server sends the playing request to the corresponding application server.

The identifier of the multimedia data may include information such as a name, a identification (ID) number, a sequential number, and/or a serial number of the multimedia data, and the multimedia data may include data such as audio data and/or video data. For example, an example of music is used, and the identifier of the multimedia data may specifically be information such as a name or sequential number of the song.

For example, when browsing a web page by using the browser, the user intends to play the song A in the web page. In this case, the user may click on the identifier of the song A, for example, an icon of the song A, so as to trigger the browser to send the playing request to the server. For another example, when receiving recommendation information of the song A shared by another user, the user intends to play the song A. In this case, the user opens the recommendation information by using the browser, and then clicks on the identifier of the song A, for example, the icon of the song A, so as to trigger the browser to send the playing request to the server.

In another embodiment of the present disclosure, after playing the multimedia data, for example, the song A, the user may further share the multimedia data to another user. In this case, the another user may trigger the playing request by using the recommendation information shared by the user. A method for triggering the playing request is same as the method for triggering, by using the recommendation information, the playing request by the user in the foregoing example.

Step S202: The server generates a verification parameter according to the playing request after receiving the playing request. The verification parameter is for single use and valid for a certain time duration.

Taking the server including the web page server and the application server as an example, after receiving the playing request, the web page server may send the playing request to the application server, and the application server generates the verification parameter according to the playing request.

For example, the application server may generate the corresponding verification parameter according to the playing request and based on a preset algorithm, and set a validity period of the verification parameter. The validity period may be set according to an actual application requirement, and generally, may be set to be greater than a playing time length of the multimedia data. The validity period may be respectively set according to a playing length of each piece of multimedia data, or a uniform value may be set for a plurality of pieces of multimedia data. For example, the validity period may be set based on the greatest value of the playing length in these pieces of multimedia data, and a value greater than the largest playing length is enough.

For example, when playing lengths of a plurality of pieces of multimedia data (for example, multimedia data 1, multimedia data 2, and multimedia data 3) are respectively 10 minutes, 15 minutes, and 20 minutes, according to the foregoing method for setting the validity period, validity periods of the plurality of pieces of multimedia data may be: 11 minutes, 16 minutes, and 21 minutes, respectively for each piece of the multimedia data; alternatively, the validity period may be set as the same for the plurality of pieces of multimedia data, for example and not limited to, 21 minutes; and alternatively, the validity period is set according to a preset value, for example and not limited to, 5 minutes.

That is, the method for setting the validity period may be as follows: obtaining the playing length of the multimedia data, and setting the validity period of the verification parameter according to the playing length; or setting the validity period of the verification parameter to a preset value.

In one embodiment of the present disclosure, the preset value may be set according to an actual application requirement.

Step S203: The server obtains a link address of the corresponding multimedia data according to the identifier of the multimedia data.

For example, an example in which the server includes the web page server and the application server is used, after receiving the playing request, the web page server may send the playing request to the application server, and the application server obtains the link address of the corresponding multimedia data according to the identifier of the multimedia data, for example, a uniform resource locator (URL) of the multimedia data.

For example, if the user requests to play the song A, and the identifier of the song A is added into the playing request, in this case, the application server may obtain a URL of the song A according to the identifier of the song A.

Step S204: The server generates a playing address according to the verification parameter and the link address.

For example, specifically, the application server may generate the playing address according to the verification parameter and the link address. There may be a plurality of generation methods. For example, the corresponding verification parameter may be added after the link address. Another example may be that names of the multimedia data and the link address may be combined with the verification parameter according to a preset rule.

For example, an example in which the link address of the song A is http://www.xxx.com/xxx.mp3, and the verification parameter is "123456" is used, and the playing address of the song A may be generated: http://www.xxx.com/xxx.mp3?vkey=123456.

Step S205: The server encrypts the playing address, and sends an encrypted playing address to the browser.

For example, after generating the playing address, the application server may send the playing address to the web page server, and the web page server encrypts the playing address, and sends the encrypted playing address to the browser by using the access layer.

In one embodiment of the present disclosure, an encryption method may be determined according to an actual application requirement. For example, a private protocol may be used for encryption, and a protocol format may be determined according to a current service mode and a technical architecture.

In one embodiment of the present disclosure, an encryption method may alternatively be according to a technology provided in the related technology, for example, encrypting by using various symmetric encryption algorithms and asymmetric encryption algorithms.

Step S206: After receiving the encrypted playing address, the browser decrypts the encrypted playing address, and initiates a data obtaining instruction to the server by using a decrypted address (that is, the original generated playing address), the data obtaining instruction carrying the playing address.

For example, after receiving the encrypted playing address, the browser decrypts the encrypted playing address, and then a local player is used for sending the data obtaining instruction to the web page server by using the access layer. The data obtaining instruction carries the playing address.

Step S207: The server parses the playing address carried in the data obtaining instruction, and extracts the verification parameter and the link address from the playing address.

For example, specifically, the web page server parses the data obtaining instruction, extracts the playing address carried in the data obtaining instruction, and then sends the playing address to the application server. The application server extracts the verification parameter and the link address from the playing address.

Optionally, to further improve the data security, session verification of a login state may also be performed. For example, a session identifier may be added into the data obtaining instruction. After the data obtaining instruction is received and before the playing address is parsed, a server may determine whether the data obtaining instruction is valid according to the session identifier. When the data obtaining instruction is valid, the playing address is processed. When the data obtaining instruction is invalid, the data obtaining instruction is rejected.

Step S208. The server obtains the corresponding multimedia data according to the extracted link address when determining that the verification parameter is valid.

For example, specifically, the application server may determine whether the verification parameter is valid, and obtain the corresponding multimedia data from a storage device according to the extracted link address when determining that the verification parameter is valid. When it is determined that the verification parameter is invalid, the server may reject the data obtaining instruction.

There may be a plurality of methods for determining whether the verification parameter is valid. For example, the following method may be used for determining whether the verification parameter is valid:

Determine whether the validity period of the verification parameter expires; determine that the verification parameter is invalid if the validity period of the verification parameter expires; determine whether the verification parameter has been used if the validity period of the verification parameter does not expire; determine that the verification parameter is invalid if the verification parameter has been used; and determine that the verification parameter is valid if the verification parameter has not been used.

Alternatively, whether the verification parameter has been used may be determined at first, and then whether the validity period of the verification parameter expires is determined. This may be specifically as follows:

Determine whether the verification parameter has been used; determine that the verification parameter is invalid if the verification parameter has been used; determine whether the validity period of the verification parameter expires if the verification parameter has not been used; determine that the verification parameter is invalid if the validity period of the verification parameter expires; and determine that the verification parameter is valid if the validity period of the verification parameter does not expire.

Whether the verification parameter has been used may be determined by means of searching a historical record. For example, when there is a record in the historical record, it indicates that the verification parameter has been used; or when there is no record of the verification parameter, it indicates that the verification parameter has not been used. It needs to be noted that when the verification parameter has been used, the corresponding record of the verification parameter needs to be added into the historical record, to facilitate subsequent searching.

Step S209: The server sends the multimedia data to the browser.

For example, after obtaining the multimedia data, for example, audio data corresponding to the song A, the application server may send the multimedia data to the web page server, and the web page server sends the multimedia data to the browser through the access layer.

Step S210: The browser playing the multimedia data after receiving the multimedia data.

The browser may play the multimedia data, for example, play the song A, by using a media player.

Step S211: The server destructs the verification parameter after determining that the browser completes playing the multimedia data.

For example, the browser may send a destruction instruction to the server after completing the playing, and the server destructs the verification parameter according to the destruction instruction (that is, the playing address is destructed, and a request carrying the multimedia data of the playing address is not responded any more).

Alternatively, for another example, after determining that the browser completes the playing, for example, after receiving a message sent by the browser for indicating that the playing is completed, the server independently destructs the verification parameter. In another embodiment of the present disclosure, a server may determine whether the validity period of the verification parameter expires, destructs the verification parameter when the validity period of the verification parameter expires, or otherwise, does not destruct the verification parameter.

It can be learned from the above that in this embodiment of the present disclosure, the server receives the playing request that is sent by the browser and that carries the identifier of the multimedia data, generates the verification parameter according to the playing request, and obtains the link address of the corresponding multimedia data according to the identifier of the multimedia data, then generates the playing address according to the verification parameter and the link address, and plays the multimedia data based on the playing address. Because the playing request is generated according to the verification parameter and the link address, and the verification parameter is only valid single-use, even the playing address is captured by a user by means of packet capture or by using third party software, a source file of the multimedia data cannot be obtained. Therefore, compared with the existing solution, this embodiment may solve previously existing problems and greatly improve the data security, for example and not limited to, improving the protection of a music copyright.

Figure 3A:
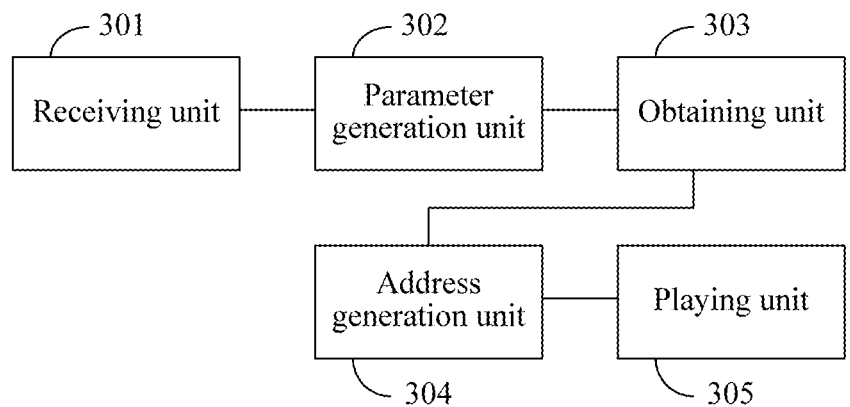
FIG. 3A is a schematic structural diagram of a multimedia data processing apparatus according to an embodiment of the present disclosure.

The embodiments of the present disclosure further provide a multimedia data processing apparatus. As shown in FIG. 3A, the multimedia data processing apparatus includes a receiving unit 301, a parameter generation unit 302, an obtaining unit 303, an address generation unit 304, and a playing unit 305.

(1) The Receiving Unit 301

The receiving unit 301 is configured to receive a playing request, the playing request carrying an identifier of multimedia data. For example, the receiving unit 301 may receive the playing request triggered by a user by using a client such as a browser.

The identifier of the multimedia data may include information such as a name and a number of the multimedia data, and the multimedia data may include data such as audio data and video data. The number of the multimedia data may be an identification number, a sequential number and/or a serial number of the multimedia data.

(2) The Parameter Generation Unit 302

The parameter generation unit 302 is configured to generate a verification parameter according to the playing request. The verification parameter is for single use and valid for a certain time duration.

For example, the parameter generation unit 302 may specifically be configured to generate the corresponding verification parameter according to the playing request and based on a preset algorithm, and set a validity period of the verification parameter.

The validity period may be set according to an actual application requirement, and generally, may be set to be greater than a playing time length of the multimedia data. The validity period may be respectively set according to a playing length of each piece of multimedia data, or a uniform value may be set for a plurality of pieces of multimedia data. For example, the validity period may be set based on the greatest value of the playing length in these pieces of multimedia data, and a value greater than the largest playing length is enough.

That is, the parameter generation unit 302 may specifically be configured to obtain the playing time length of the multimedia data, and set the validity period of the verification parameter according to the playing length.

Alternatively, the parameter generation unit 302 may specifically be configured to set the validity period of the verification parameter to a preset value.

In another embodiment of the present disclosure, the preset value may be set according to requirements of an actual application.

(3) The Obtaining Unit 303

The obtaining unit 303 is configured to obtain a link address of the corresponding multimedia data according to the identifier of the multimedia data.

(4) The Address Generation Unit 304

The address generation unit 304 is configured to generate a playing address according to the verification parameter and the link address.

There may be a plurality of generation methods. For example, the corresponding verification parameter may be added after the link address, or a name that is of the multimedia data and that is in the link address may be combined with the verification parameter according to a preset rule.

For example, an example in which the link address is http://www.xxx.com/xxx.mp3, and the verification parameter is "123456" is used, and the playing address may be generated: http://www.xxx.com/xxx.mp3?vkey=123456.

(5) The Playing Unit 305

The playing unit 305 is configured to play the multimedia data based on the playing address. The playing unit 305 may be, for example, as follows:

The playing unit 305 may include an instruction obtaining subunit, an extraction subunit, a data obtaining subunit, and a playing subunit.

The instruction obtaining subunit is configured to obtain a data obtaining instruction carrying the playing address.

The extraction subunit is configured to extract the verification parameter and the link address from the playing address carried in the data obtaining instruction.

The data obtaining subunit is configured to obtain the corresponding multimedia data according to the extracted link address when it is determined that the verification parameter is valid.

For example, the data obtaining unit may specifically be configured to determine that the verification parameter is valid when determining that the validity period of the verification parameter does not expire and the verification parameter has not been previously used.

Refer to the foregoing method embodiment for the specific method for determining whether the validity period of the verification parameter expires and determining whether the verification parameter has been used. Details are not described herein again.

The playing subunit is configured to send the multimedia data to a client to play the multimedia data.

Optionally, to further improve the data security, session verification of a login state may also be performed. For example, a session identifier may be added into the data obtaining instruction. After the data obtaining instruction is received and before the playing address is parsed, a server may determine whether the data obtaining instruction is valid according to the session identifier. When the data obtaining instruction is valid, the playing address is parsed. When the data obtaining instruction is invalid, the data obtaining instruction is rejected. That is, the data obtaining instruction further carry the session identifier, and the playing unit 305 may further include a verification subunit.

The verification subunit may be configured to determine whether the data obtaining instruction is valid according to the session identifier; when the data obtaining instruction is valid, trigger the extraction subunit to perform the step of extracting the verification parameter and the link address from the playing address carried in the data obtaining instruction; and reject the data obtaining instruction when the data obtaining instruction is invalid.

Figure 3B:
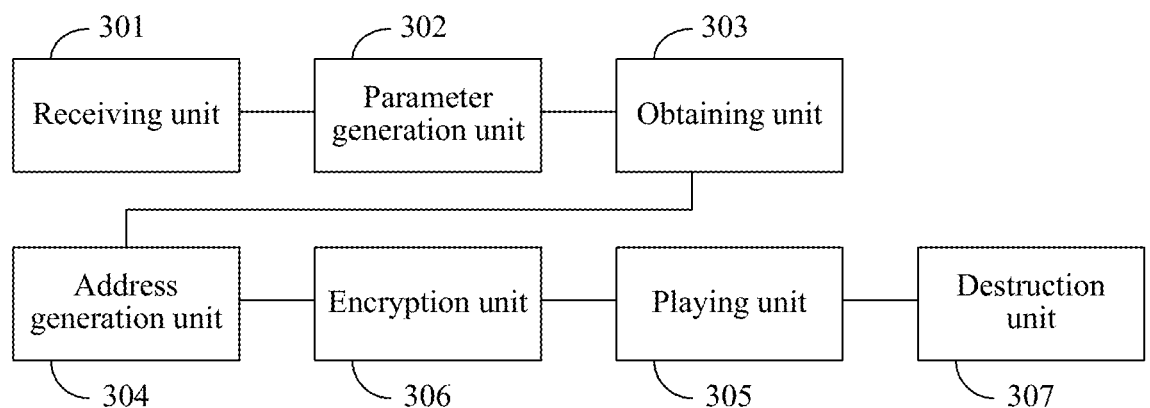
FIG. 3B is another schematic structural diagram of a multimedia data processing apparatus according to an embodiment of the present disclosure.

Optionally, to further improve the data security, the playing address may further be encrypted after the playing address is generated. As shown in FIG. 3B, the multimedia data processing apparatus may further include an encryption unit 306.

The encryption unit 306 may be configured to encrypt the playing address after the playing address is generated according to the verification parameter and the link address.

Optionally, to avoid an illegal theft of the verification parameter, after the multimedia data is played, the verification parameter may further be destructed (that is, the playing address is destructed). In another embodiment of the present disclosure, the destruction of the verification parameter may depends on whether the validity period of the verification parameter has passed. The destruction of the verification parameter to prevent a user from visiting the playing address again by using another method. As shown in FIG. 3B, the multimedia data processing apparatus may further include a destruction unit 307.

The destruction unit 307 may be configured to destruct the verification parameter. The destruction unit 307 may be, for example, as follows:

The destruction unit 307 may specifically be configured to receive a destruction instruction, and destruct the verification parameter according to the destruction instruction; or the destruction unit 307 may specifically be configured to determine whether the validity period of the verification parameter expires, and destruct the verification parameter when the validity period of the verification parameter expires.

The multimedia data processing apparatus may specifically be integrated into a network device such as a server.

During specific implementation, the foregoing units may be implemented as independent entities, or may be combined arbitrarily to be implemented as a same entity or several entities. For specific implementation of the foregoing units, refer to the foregoing method embodiments. Details are not described herein again.

It can be learned from the above that in the multimedia data processing apparatus according to this embodiment of the present disclosure, the receiving unit 301 may receive the playing request carrying the identifier of the multimedia data, then the parameter generation unit 302 generates the verification parameter according to the playing request, and the obtaining unit 303 obtains the link address of the corresponding multimedia data according to the identifier of the multimedia data, then the address generation unit 304 generates the playing address according to the verification parameter and the link address, and the playing unit 305 plays the multimedia data based on the playing address. Because in this solution, the playing request is generated according to the verification parameter and the link address, and the verification parameter is only valid single-use, even the playing address is captured by a user by means of packet capture or by using third party software, a source file of the multimedia data cannot be obtained. Therefore, compared with the existing solution, this solution may greatly improve the data security.

Furthermore, the embodiments of the present disclosure further provide a multimedia data processing system which may include any multimedia data processing apparatus provided in the embodiments of the present disclosure. The multimedia data processing apparatus may specifically be integrated in a network device such as a sever.

In terms of a specific integration method, the multimedia data processing apparatus may be integrated in one network device, or may be distributed in a plurality of network devices.

For example, an example in which the multimedia data processing apparatus is integrated in the server is used, and an optional example of the multimedia data processing apparatus is shown in FIG. 1A, and may specifically be as follows:

The server is configured to: receive a playing request carrying an identifier of multimedia data, generate a verification parameter according to the playing request, and obtain a link address of the corresponding multimedia data according to the identifier of the multimedia data, generate a playing address according to the verification parameter and the link address, and play the multimedia data based on the playing address.

For example, the server may specifically be configured to: receive the playing request sent by a client, generate the corresponding verification parameter according to the playing request and based on a preset algorithm, and set a validity period of the verification parameter; and obtain the link address of the corresponding multimedia data according to the identifier of the multimedia data, then generate the playing address according to the verification parameter and the link address, and send the playing address to the client, and then when receiving a data obtaining instruction that is returned by the client and that carries the playing address, extract the verification parameter and the link address from the playing address carried in the data obtaining instruction, determine whether the verification parameter is valid, when the verification parameter is valid, obtain the corresponding multimedia data according to the extracted link address, and send the multimedia data to the client, so that the client plays the multimedia data.

The validity period may be set according to a requirement of an actual application, and generally, may be set to be greater than a playing time length of the multimedia data.

Optionally, to improve the data security, before generating the playing address, the server may further be configured to encrypt the playing address; and if the playing address is encrypted, subsequently, when receiving the data obtaining instruction, the client needs to decrypt an encrypted playing address. The encryption and decryption methods may be set according to a requirement of an actual application.

Optionally, to further improve the data security, a session identifier may further be added into the data obtaining instruction. In this case, after receiving the data obtaining instruction and before parsing the playing address, the server may further be configured to determine whether the data obtaining instruction is valid according to the session identifier. When the data obtaining instruction is valid, the server performs the step of extracting the verification parameter and the link address from the playing address carried in the data obtaining instruction. When the data obtaining instruction is invalid, the server rejects the data obtaining instruction.

Optionally, to avoid an illegal theft of the verification parameter, after the multimedia data is played, the verification parameter may further be destructed.

That is, the server may further be configured to receive a destruction instruction, and destruct the verification parameter according to the destruction instruction; or the server may specifically be configured to determine whether the validity period of the verification parameter expires, and destruct the verification parameter when the validity period of the verification parameter expires.

Furthermore, the multimedia data processing system may further include other devices, for example, a client and a storage device.

The client is configured to send the playing request to the server and receive the playing address returned by the server. The client is also configured to request for the multimedia data from the server according to the playing address, and play the received multimedia data after receiving the multimedia data returned by the server.

The storage device is configured to store the multimedia data, and provide the multimedia data for the server.

Specific processing on the foregoing devices may be understood according to the foregoing record of the embodiments of the present disclosure.

It may be understood that division of functions of the multimedia data processing apparatuses shown in FIG. 3A and FIG. 3B is an example. A person skilled in the art may easily change function structures according to the descriptions of FIG. 3A and FIG. 3B, for example, combine the function structures, or further divide some function structures. Therefore, the function structures of the multimedia data processing apparatus provided in the embodiments of the present disclosure are not limited to FIG. 3A and FIG. 3B.

Figure 3C:
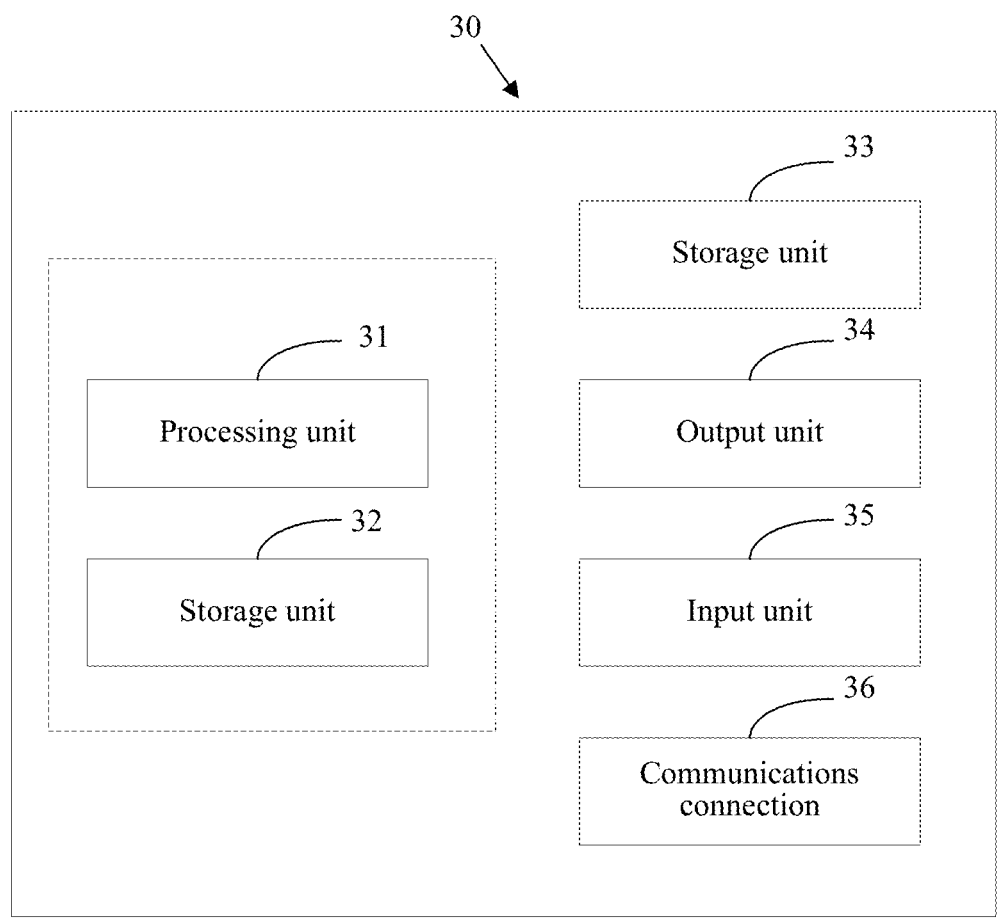
FIG. 3C is another schematic structural diagram of a multimedia data processing apparatus according to an embodiment of the present disclosure.

In terms of hardware structures of the multimedia data processing apparatus provided in the embodiments of the present disclosure, FIG. 3C shows an example of a schematic structural diagram of a multimedia data processing apparatus provided in the embodiments of the present disclosure. The structure shown in FIG. 3C is only an example of a proper structure, and is not intended to suggest any limitation to a structure of an electronic device. A multimedia data processing apparatus 30 includes a personal computer, a server computer, a handheld or laptop device, a mobile device (for example, a mobile phone, a personal digital assistant (PDA), or a media player), a consumption-based electronic device, a small computer, a mainframe computer, and a distributed computing environment including any of the foregoing devices.

Although not required, the embodiments are described in a universal background that "computer readable instructions" are executed by one or more electronic devices. The computer readable instructions may be distributed by a computer readable medium (which is described below). The computer readable instructions may be implemented as a program module, for example, a function, an object, an application programming interface (API), or a data structure for executing a specific task or implementing a specific abstract data type. Typically, functions of the computer readable instructions may be randomly combined or distributed in various environments.

FIG. 3C shows an example of a structure including the multimedia data processing apparatus 30 provided in this embodiment of the present disclosure. In a configuration, the multimedia data processing apparatus 30 includes at least one processing unit 31 and storage unit 32. According to a specific configuration and type of an electronic device, the storage unit 32 may be volatile (for example, a RAM), non-volatile (for example, a ROM or a flash memory), or a combination thereof. The configuration is shown in FIG. 3C by using a dashed line.

In another embodiment, the multimedia data processing apparatus 30 may include an additional feature and/or function. For example, the multimedia data processing apparatus 30 may further include an additional storage apparatus (for example, removable or non-removable), which includes but is not limited to a magnetic storage apparatus and an optical storage apparatus. Such an additional storage apparatus is shown by using a storage unit 33 in FIG. 3C. In an embodiment, the computer readable instructions used for implementing one or more embodiments provided in the embodiments of the present disclosure may be stored in the storage unit 33. The storage unit 33 may further store other computer readable instructions used for implementing an operation system, an application and the like. The computer readable instructions may be added into the storage unit 32 to be executed by, for example, the processing unit 31.

The term "computer readable medium" used in this embodiment of the present disclosure includes a computer storage medium. The computer storage medium includes volatile and non-volatile media, and removable and non-removable media implemented by using any method or technology used for storing information such as the computer readable instructions or other data. The storage unit 32 and the storage unit 33 are examples of the computer storage medium. The computer storage medium includes but is not limited to a RAM, a ROM, an EEPROM, a flash memory, or another memory technology, a CD-ROM, a digital versatile disk (DVD), or another optical storage apparatus, a cassette magnetic tape, a magnetic tape, a magnetic disk storage apparatus, or another magnetic storage device, or any other medium that may be used for storing expected information and may be visited by the multimedia data processing apparatus 30. Any of these computer storage media may be a part of the multimedia data processing apparatus 30.

The multimedia data processing apparatus 30 may further include a communications connection 36 allowing communication between the multimedia data processing apparatus 30 and another device. The communications connection 36 may include but is not limited to a modem, an network interface card (NIC), an integrated network interface, a radio transmitter/receiver, an infrared plot, a USB connection, or another connection used for connecting the multimedia data processing apparatus 30 to another electronic device. The communications connection 36 may include wired connection or wireless connection. The communications connection 36 may transmit and/or receive communications media.

The term "computer readable medium" may include a communications medium. The communications medium typically includes a computer readable instruction or other data in a "modulated data signal" of a carrier or another transmission mechanism, and includes any information delivery medium. The term "modulated data signal" may include such a signal: one or more of features of the signal are set or changed according to a manner of encoding information into the signal.

The multimedia data processing apparatus 30 may include an input device 35, for example, a keyboard, a mouse, a pen, an audio input device, a touch input device, an infrared camera, a video input device, and/or any other input device. The multimedia data processing apparatus 30 may also include an output device 34, for example, one or more displays, speakers, printers, and/or any other output device. The input device 35 and the output device 34 may connect to the multimedia data processing apparatus 30 by means of the wired connection, the wireless connection, or any combination thereof. In an embodiment, an input device or an output device of another electronic device may be used as the input device 35 or the output device 34 of the multimedia data processing apparatus 30.

Components of the multimedia data processing apparatus 30 may be connected by using various interconnections (for example, a bus). Such interconnections may include a peripheral component interconnection (PCI) (for example, a rapid PCI), a universal serial bus (USB), a live wire (for example, IEEE 1394), an optical bus structure, and the like. In another embodiment, the components of the multimedia data processing apparatus 30 may be connected by using the network. For example, the storage unit 32 may include a plurality of physical memory units that are at different physical positions and that are interconnected by using the network.

The multimedia data processing system may include any multimedia data processing apparatus provided in the embodiments of the present disclosure, and therefore, can achieve the beneficial effects that can be achieved by any multimedia data processing apparatus provided in the embodiments of the present disclosure. For details, refer to the foregoing embodiments. Details are not described herein again.

A person of ordinary skill in the art may understand that all or some of the steps of the methods in the foregoing embodiments may be implemented by a program instructing relevant hardware. The program may be stored in a computer readable storage medium. The storage medium may include: a read-only memory (ROM), a random access memory (RAM), a magnetic disk, an optical disc, or the like.

The multimedia data processing method, apparatus, and system provided in the embodiments of the present disclosure are described above in detail. Although the principles and implementations of the present disclosure are described by using specific embodiments in the specification, the foregoing descriptions of the embodiments are merely intended to help understand the method and core idea of the method of the present disclosure. Meanwhile, a person skilled in the art may make modifications to the specific implementations and application range according to the idea of the present disclosure. In conclusion, the content of the specification should not be construed as a limitation to the present disclosure.

What is claimed is:

1. A method for processing multimedia data, the method comprising:
   receiving, by a device comprising a memory and a processor in communication with the memory, a playing request from a remote terminal, the playing request carrying an identifier of multimedia data;
   generating, by the device, a verification parameter according to the playing request using a preset conversion algorithm, wherein:
      the verification parameter is for single-use, and
      the verification parameter is valid within a preset validity period and is invalid outside the preset validity period;
   obtaining, by the device, a link address of the multimedia data according to the identifier of the multimedia data;
   generating, by the device, a playing address according to the verification parameter and the link address;
   sending, by the device, the playing address to the remote terminal;
   receiving, by the device, a request for multimedia data carrying the playing address;
   extracting, by the device, the verification parameter and the link address from the playing address carried in the request for multimedia data;
   determining, by the device, whether the verification parameter is valid;
   when it is determined that the verification parameter is valid, obtaining, by the device, the multimedia data according to the link address for delivery to the remote terminal;
   when it is determined that the verification parameter is invalid, rejecting, by the device, the request for multimedia data; and
   delivering the multimedia data according to the playing address to the remote terminal for playing the multimedia data,
   wherein the determining, by the device, whether the verification parameter is valid comprises:
   determining, by the device, whether the preset validity period of the verification parameter expires and whether the verification parameter has been previously used;
   when it is determined that the preset validity period of the verification parameter expires or the verification parameter has been previously used, determining, by the device, that the verification parameter is invalid; and
   when it is determined that the preset validity period of the verification parameter does not expire and the verification parameter has not been previously used, determining, by the device, that the verification parameter is valid.

2. The method according to claim 1, further comprising:
   obtaining, by the device, a playing length of the multimedia data; and
   setting, by the device, the preset validity period of the verification parameter according to the playing length or a preset length.

3. The method according to claim 1, wherein:
   the request for multimedia data comprises a session identifier; and
   before extracting the verification parameter and the link address from the playing address carried in the request for multimedia data, the method further comprises:
      determining, by the device, whether the request for multimedia data is valid according to the session identifier,
      when it is determined that the request for multimedia data is valid, performing, by the device, the step of extracting the verification parameter and the link address from the playing address carried in the request for multimedia data, and
      when it is determined that the request for multimedia data is invalid, rejecting, by the device, the request for multimedia data.

4. The method according to claim 1, wherein after the generating, by the device, the playing address according to the verification parameter and the link address, and before delivering the playing address to the remote terminal, the method further comprises encrypting, by the device, the playing address.

5. The method according to claim 4, wherein the encrypting the playing address by the device is based on a asymmetric encryption algorithm such that only the remote terminal has a key to decrypt the playing address.

6. The method according to claim 1, further comprising destructing, by the device, the verification parameter.

7. The method according to claim 6, wherein the destructing, by the device, the verification parameter comprises:
   receiving, by the device, a destruction instruction, and destructing, by the device, the verification parameter according to the destruction instruction; or
   determining whether the preset validity period of the verification parameter expires, and when it is determined that the preset validity period of the verification parameter expires, destructing, by the device, the verification parameter.

8. An apparatus for processing multimedia data, the apparatus comprising:
   a memory storing instructions; and
   a processor in communication with the memory, wherein the processor, when executing the instructions, is configured to cause the apparatus to:
      receive a playing request from a remote terminal, the playing request carrying an identifier of multimedia data,
      generate a verification parameter according to the playing request using a preset conversion algorithm, wherein:
         the verification parameter is for single-use, and
         the verification parameter is valid within a preset validity period and is invalid outside the preset validity period,
      obtain a link address of the multimedia data according to the identifier of the multimedia data,
      generate a playing address according to the verification parameter and the link address, and
      send the playing address to the remote terminal;
      receive a request for multimedia data carrying the playing address;
      extract the verification parameter and the link address from the playing address carried in the request for multimedia data;
      determine whether the verification parameter is valid;
      when it is determined that the verification parameter is valid, obtain the multimedia data according to the link address for delivery to the remote terminal;
      when it is determined that the verification parameter is invalid, reject the request for multimedia data; and deliver the multimedia data according to the playing address to the remote terminal for playing the multimedia data, wherein, when the processor is configured to cause the apparatus to determine whether the verification parameter is valid, the processor is configured to cause the apparatus to:

determine whether the preset validity period of the verification parameter expires and whether the verification parameter has been previously used;

when it is determined that the preset validity period of the verification parameter expires or the verification parameter has been previously used, determine that the verification parameter is invalid; and when it is determined that the preset validity period of the verification parameter does not expire and the verification parameter has not been previously used, determine that the verification parameter is valid.

9. The apparatus according to claim 8, wherein the processor, when executing the instructions, is further configured to cause the apparatus to:

obtain a playing length of the multimedia data; and set the preset validity period of the verification parameter according to the playing length or a preset length.

10. The apparatus according to claim 8, wherein:

the request for multimedia data comprises a session identifier; and before the processor is configured to cause the apparatus to extract the verification parameter and the link address from the playing address carried in the request for multimedia data, the processor is configured to cause the apparatus to:

determine whether the request for multimedia data is valid according to the session identifier, when it is determined that the request for multimedia data is valid, extract the verification parameter and the link address from the playing address carried in the request for multimedia data; and when it is determined that the request for multimedia data is invalid, reject the request for multimedia data.

11. The apparatus according to claim 8, wherein, after the processor is configured to cause the apparatus to generate the playing address according to the verification parameter and the link address, and before the processor is configured to cause the apparatus to deliver the playing address to the remote terminal, the processor is configured to cause the apparatus to encrypt the playing address.

12. The apparatus according to claim 11, wherein encrypting the playing address by the apparatus is based on a asymmetric encryption algorithm such that only the remote terminal has a key to decrypt the playing address.

13. The apparatus according to claim 8, wherein the processor further is configured to cause the apparatus to destruct the verification parameter.

14. The apparatus according to claim 13, wherein, when the processor is configured to cause the apparatus to destruct the verification parameter, the processor is configured to cause the apparatus to:

receive a destruction instruction, and destruct the verification parameter according to the destruction instruction; or determine whether the preset validity period of the verification parameter expires, and when it is determined that the preset validity period of the verification parameter expires, destruct the verification parameter.

15. A non-transitory computer readable storage medium storing instructions, the instructions, when executed by a processor, cause the processor to perform:

receiving a playing request from a remote terminal, the playing request carrying an identifier of multimedia data;

generating a verification parameter according to the playing request using a preset conversion algorithm, wherein:

the verification parameter is for single-use, and the verification parameter is valid within a preset validity period and is invalid outside the preset validity period;

obtaining a link address of the multimedia data according to the identifier of the multimedia data;

generating a playing address according to the verification parameter and the link address;

sending the playing address to the remote terminal;

receiving a request for multimedia data carrying the playing address;

extracting the verification parameter and the link address from the playing address carried in the request for multimedia data;

determining whether the verification parameter is valid;

when it is determined that the verification parameter is valid, obtaining the multimedia data according to the link address for delivery to the remote terminal;

when it is determined that the verification parameter is invalid, rejecting the request for multimedia data; and delivering the multimedia data according to the playing address to the remote terminal for playing the multimedia data, wherein the determining whether the verification parameter is valid comprises:

determining whether the preset validity period of the verification parameter expires and whether the verification parameter has been previously used;

when it is determined that the preset validity period of the verification parameter expires or the verification parameter has been previously used, determining that the verification parameter is invalid; and when it is determined that the preset validity period of the verification parameter does not expire and the verification parameter has not been previously used, determining that the verification parameter is valid.

* * * * *